United States Patent [19]

Lee et al.

[11] 4,024,091

[45] May 17, 1977

[54] SPONGEABLE SILICONE GUM STOCK

[75] Inventors: Chi-Long Lee; Gary M. Ronk, both of Midland, Mich.

[73] Assignee: Dow Corning Corporation, Midland, Mich.

[22] Filed: July 14, 1975

[21] Appl. No.: 595,918

[52] U.S. Cl. .................... 260/2.5 S; 260/2.5 D; 260/2.5 FP; 260/37 SB; 260/46.5 H; 260/46.5 UA; 260/46.5 G; 260/825

[51] Int. Cl.$^2$ ............................................ C08J 9/02

[58] Field of Search ............ 260/46.5 G, 46.5 UA, 260/46.5 H, 2.5 S, 825

[56] References Cited

UNITED STATES PATENTS

| | | | |
|---|---|---|---|
| 3,425,967 | 2/1969 | Modic | 260/2.5 S |
| 3,677,981 | 7/1972 | Wada et al. | 260/2.5 S |
| 3,923,705 | 12/1975 | Smith | 260/2.5 S |

*Primary Examiner*—Morton Foelak
*Attorney, Agent, or Firm*—Roger H. Borrousch

[57] ABSTRACT

Polydiorganosiloxane gum base stocks which contain per 100 parts by weight of the stock, 15 to 60 parts by weight of an organosiloxane having an average of at least 2 silicon-bonded hydroxyl radicals per molecule, 3 to 25 parts by weight of an organosiloxane having an average of at least 2.5 silicon-bonded hydrogen atoms per molecule, 0.05 to 0.5 parts by weight acetylenic alcohol inhibitor and 1 to 200 p.p.m. platinum as a platinum catalyst, can be sponged by heating the composition above 125° C. The sponged products are elastomeric, have flame retardant properties and can be used where applications see relatively high temperatures.

16 Claims, No Drawings

SPONGEABLE SILICONE GUM STOCK

BACKGROUND OF THE INVENTION

1. Field of the Invention

This invention relates to spongeable silicone gum stocks, to the method of preparation and to the sponge product.

2. Description of the Prior Art

It is known that silicone rubber can be foamed or sponged by using various blowing agents which release nitrogen or carbon dioxide gas. Berridge in U.S. Pat. No. 2,857,343 describes using blowing agents such as dinitrosopentamethylenetetramine and N,N'-dimethyl-N,N'— dinitrosoterephthalamide with a combination of two peroxide catalysts, tertiary butyl perbenzoate and either benzoyl peroxide or bis-(2,4-dichlorobenzoyl)peroxide to make silicone rubber sponge. Berridge in U.S. Pat. No. 2,875,163 describes using a heating process before adding the catalyts and blowing agent to improve the final product. Wade and Blanchard in U.S. Pat. No. 2,951,819 describe making cellular rubber-like articles using stearic acid and alkyl metal borohydrides as the blowing agent. Wade et al. also describe using sodium carbonate and p,p-oxybis(-benzene sulfonyl hydrazide) as blowing agents for natural and synthetic rubber-like materials. Smith in U.S. Pat. No. 3,238,157 describe making cellular silicone rubber by mixing silicone gums with partuclate, solid, void-producing matter, by curing the mixture to a silicone elastomer and thereafter leaching out the particulate matter thereby forming the cellular silicone rubber.

Bond and Tomita in U.S. Pat. No. 3,271,332 describe making a room temperature vulcanizable siloxane foam by adding a basic vulcanization catalysts, such as dibutyltindilaurate to a mixture of 60 to 80 parts by weight of a diorganopolysiloxane fluid gum free of hydroxyl termination having a viscosity of 1,000 to 50,000 cps. at 25° C., 40 to 20 parts by weight of a benzenesoluble silicone resin composed of $R_3SiO_{0.5}$ and $SiO_2$ units, sufficient methyl hydrogen polysiloxane to provide from 0.017 to 0.17 part by weight silanic hydrogen and between 0.1 to 2 parts by weight of a basic vulcanization catalyst active to split off silanic hydrogen.

Modic in U.S. Pat. No. 3,425,967 describes a foamable mixture comprising 100 parts of a vinyl chain-stopped polysiloxane, 10 to 100 parts organopolysiloxane copolymer of $R_3SiO_{0.5}$ and $SiO_2$ units having 2.5 to 10 mole percent silicon-bonded vinyl groups, 10 to 100 parts asbestos or fibrous potassium titanate, 0 to 50 parts of a finely divided inorganic filler, a platinum catalyst, an amount of liquid organohydrogenpolysiloxane to provide from 0.5 to 1.0 silicon-bonded hydrogen atoms per silicon-bonded vinyl group and 1 to 5 parts of a blowing agent, such as azo-isobutyronitrile, dinitrosopentamethylenetetramine, benzenesulfonhydrazide, N,N'-dinitrosoN,N'-dimethylterephthalamide, p,p'-oxy-bis-(beznene-sulfonhydrazide), terephthalazide and azodicarbonamide.

Wada, Itoh and Kuga in U.S. Pat. No. 3,677,981 describe foamable silicone elastomeric compositions comprising 80 to 99 parts diorganopolysiloxane gum having a viscosity of at least 1,000,000 cs, at 25° C. and 0.025 to 0.25 moles of vinyl group, 1 to 20 parts of diorganopolysiloxane having a viscosity of at least 10 cs. at 25° C. and at least ten times as many moles of vinyl group as the gum, an amount of organohydrogenpolysiloxane such that the Si—H linkages are from 50 to 200 mole percent of the total vinyl groups and there are at least three Si-H per molecule, 20 to 100 parts of silica, a catalytic amount of a platinum catalyst and 1 to 10 parts blowing agent such as azobisisobutyronitrile, dinitrosopentamethylenetetramine, N,N'-dimethyldinitrosoterephthalamide and diaminobenzene.

Other than Bond et al. cited above, these references describe heat activated and curing foams. Siloxane foams have also been prepared at room temperature by combining hydroxylated organopolysiloxanes, silicon-bonded hydrogen and tin salts of carboxylic acid such as described by Bruner in U.S. Pat. No. 3,070,555, by Nitzsche et al. in U.S. Pat. No. 3,338,847, Hersh in U.S. Pat. No. 3,429,838, Joyce in U.S. Pat. No. 2,956,032 and Nitzsche et al. in U.S. Pat. No. 3,428,580. More recently, Schuyler B. Smith in an application Ser. No. 519,380, filed Oct. 30, 1974, now U.S. Pat. No. 3,923,705 and assigned to the same assignee as this application described a method of making organosiloxane foams by mixing an organohydrogensiloxane having at least three silicon-bonded hydrogen atoms per molecule, a hydroxylated organosiloxane having from greater than 1.0 to 2.5 silicon-bonded hydroxyl radicals per molecule and a platinum catalyst wherein the molar ratio of silicon-bonded hydrogen atoms to silicon-bonded hydroxyl radicals is from 2.5 to 40 and the viscosity of the mixture is less than 100,000 cps. at 25° C. Smith also describes a method wherein there is also present a benzene-soluble vinyl containing triorganosiloxy endblocked polydiorganosiloxane.

Foams or sponges described above use external blowing agents or use tin salts with silicon-bonded hydrogen to make the foam. The external blowing agents are useful but many are dangerous to handle or there is difficulty in regulating the gas formation from the blowing agent and the curing at the same time. The prior art patents have therefore made various contributions to overcome this problem. Additionally the resulting foam properties required improvement and composition variations were also described by these references to improve the foam properties. Foams could be prepared using tin salts but these foams were not as useful as hoped for, because of properties and stability over broad temperature ranges. Smith in Ser. No. 519,380 describes a more suitable foam which could be used in areas where fire retardancy was required, however, Smith's method required use within a short period of time, once the ingredients were all mixed. It was therefore unexpected that a platinum catalyst could be used to make gum based stocks foam because they require substantial mixing, such as on mills, to prepare the compositions and premature foaming and curing would certainly not be desirable, especially if it occured on the mill.

SUMMARY OF THE INVENTION

It is an object of this invention to provide spongeable silicone gum based compositions and to a method to make same.

This invention relates to a spongeable silicone composition comprising a polydiorganosiloxane gum base stock, a hydroxylated organosiloxane, a siloxane having silicon-bonded hydrogen atoms, a platinum catalyst and a platinum catalyst inhibitor. These compositions can be prepared and stored and foam when heated to provide a sponge product.

DESCRIPTION OF THE INVENTION

This invention relates to a spongeable silicone composition comprising (A) 100 parts by weight of a polydiorganosiloxane gum base stock, (B) from 15 to 60 parts by weight of an organosiloxane having an average of at least 2 silicon-bonded hydroxyl radicals per molecule, where the organosiloxane (B) has from 0.5 to 3 parts by weight silicon-bonded hydroxyl radical in the amount of organosiloxane (B) present, (C) from 3 to 25 parts by weight of an organohydrogensiloxane having an average of at least 2.5 silicon-bonded hydrogen atoms per molecule, where the organohydrogensiloxane (C) has from 0.01 to 0.5 parts by weight silicon-bonded hydrogen atoms in the amount of organohydrogensiloxane (C) present, (D) from 0.05 to 0.5 parts by weight of an acetylenic alcohol inhibitor, and (E) from 1 to 200 parts by weight platinum per one million parts by weight silicone composition wherein the platinum is in the form of a platinum catalyst, in said spongeable silicone composition (B) and (C) are present in amounts such that the molar ratio of silicon-bonded hydrogen atoms to silicon-bonded hydroxyl radicals is from 1 to 5.

The polydiorganosiloxane gum base stock can be any of the gum stocks available commercially and well known in the art. These gum stocks basically comprise a polydiorganosiloxane gum and a reinforcing filler, such as fume silica, and often contain other additives such as plasticizers, heat stability additives, pigments and colorants, extending fillers, flame retardant additives, compression set additives, anti-bloom additives, handling additives and the like. The polydiorganosiloxane gums can generally be described as benzene soluble and having a Williams plasticity of greater than 0.030 inch. The organic groups on the polydiorganosiloxane gums can be any of those found in the commercial gum stocks including methyl, phenyl, vinyl, 3,3,3-trifluoropropyl, amoung others. These gums are most commonly endblocked with triorganosiloxy units or hydroxyl radicals. The polydiorganosiloxane gum base stocks can be either uncatalyzed or catalyzed with a vulcanizing agent such as an organic peroxide.

The organosiloxane, (B) can be any organosiloxane or mixture of organosiloxanes which have an average of at least two silicon-bonded hydroxyl radicals per molecule. These organosiloxanes can be any of the monovalent organic groups which do not interfere with the curing or foaming action of the composition. Preferably, the organic groups are alkyl radicals having from 1 to 6 carbon atoms per radical, such as methyl, ethyl, propyl, butyl, pentyl, hexyl, isopropyl, tertiary butyl, and cyclohexyl, phenyl radicals or 3,3,3-trifluoropropyl radicals. In the amount of the organosiloxanes of (B) present in the composition, there is from 0.5 to 3 parts by weight of silicon-bonded hydroxyl radical, preferably from 0.5 to 2.5 parts by weight. These organosiloxanes can be homopolymers, copolymers or mixtures thereof. They can be mixtures of different molecular weight species and varying hydroxyl contents as long as the average falls within the defined range. These organosiloxanes preferably contain an average of at least one organic radical per silicon atom. Examples of the organosiloxanes, (B), include hydroxyl endblocked polydimethylsiloxane, hydroxyl endblocked polydiorganosiloxanes having siloxane units of dimethylsiloxane and phenylmethylsiloxane, hydroxyl endblocked polymethyl-3,3,3-trifluoropropylsiloxane and hydroxyl endblocked polyorganosiloxane having siloxane units of monomethylsiloxane, dimethylsiloxane, monophenylsiloxane and diphenylsiloxane. The organosiloxanes can also include mixtures of hydroxylated organosiloxane polymers and hydroxylated organosilanes, such as a mixture of hydroxyl endblocked polydimethylsiloxane and diphenylmethylsilanol. The molecular weight of these organosiloxanes will be limited by the amount of silicon-bonded hydroxyl radical as defined by the limits recited above. The organosiloxane is preferably a hydroxyl endblocked polydimethylsiloxane having a viscosity of from 20 to 200 cps. at 25° C.

The organohydrogensiloxane, (C) can be any siloxane having an average of at least 2.5 silicon-bonded hydrogen atoms per molecule and an average of no more than one-silicon-bonded hydrogen atom per silicon atom. The remaining valences of the silicon atoms are satisfied by divalent oxygen atoms or by monovalent radicals of alkyl having one to six carbon atoms per radical, such as methyl, ethyl, propyl, isopropyl, butyl, tertiary butyl, pentyl, hexyl, cyclohexyl, or phenyl or 3,3,3-trifluoropropyl. The organohydrogensiloxanes can be homopolymers, copolymers and mixtures thereof which contain siloxane units of the following types:

$RSiO_{1.5}$, $R_2SiO$, $R_3SiO_{0.5}$,
$RSHiO$, $HSiO_{1.5}$, $R_2HSiO_{0.5}$,
$H_2SiO$, $RH_2SiO_{0.5}$ and $SiO_2$ where R is the monovalent radical defined above. Some specific examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane and copolymers of dimethylhydrogensiloxane, dimethylsiloxane and methylhydrogensiloxane. Preferably, the organohydrogensiloxanes have an average of at least five silicon-bonded hydrogen atoms per molecule. In the amount of the organohydrogensiloxanes of (C) present in the composition, there is from 0.01 to 0.5 parts by weight silicon-bonded hydrogen atoms. The organohydrogensiloxane is preferably a trimethylsiloxy endblocked polymethylhydrogensiloxane having a viscosity of from 10 to 200 cps. at 25° C.

The acetylenic alcohol inhibitors, (D), are those acetylenic alcohols which are inhibitors for platinum catalyzed compositions at room temperature as described in U.S. Pat. No. 3,445,420 which is hereby incorporated by reference to show this class of inhibitors. Examples of these inhibitors include 3-methyl-1-pentyl-3-ol, 1-ethynylcyclo-hexan-1-ol, 3,5-dimethyl-1-hexyn-3-ol, 3-phenyl-1-butyn-3-ol and 3-methyl-1-butyn-3-ol.

Platinum catalyst, (E), can be any of the known forms, ranging from platinum as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, on account of its easy dispersability in organosilicon systems and its non-effect on color of the mixture. Another preferred platinium catalyst is a chloroplatinic acid catalyst complex as prepared by the method described in U.S. Pat. No. 3,419,593 which is hereby incorporated by reference, where chloroplatinic acid hexahydrate is mixed with symetrical divinyltetramethyldisiloxane to provide the complex. Another similar complex is one prepared from the chloroplatinic acid hexahydrate, symetrical divinyltetramethyldisiloxane, symetrical tetramethyldisiloxane and alcohol solvent. Additional platinum compounds which include,

platinum bromides, a complex of platinous halide and an olefin such as ethylene, propylene, butylene, cyclohexene and styrene,

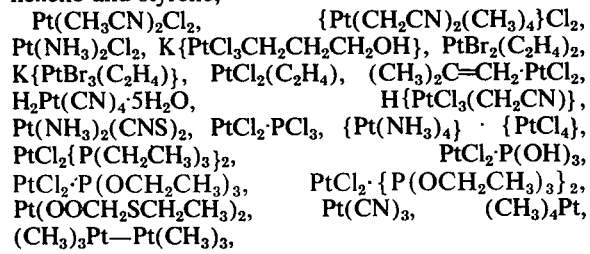

PtCl$_2$CO and PtBr$_2$CO.

The amounts of ingredients are based on 100 parts by weight of the polydiorganosiloxane gum base stock, (A). The organosiloxane, (B), can be present in amounts from 15 to 60 parts by weight, preferably from 20 to 50 parts by weight. The organohydrogensiloxane, (C), can be present in amounts from 3 to 25 parts by weight, preferably from 5 to 15 parts by weight. The acetylenic alcohol inhibitor, (D), can be present in amounts from 0.05 to 0.5 parts by weight and the platinum catalyst (E) can be present in amounts of from 1 to 200 parts by weight platinum per one million parts by weight silicone composition. The amounts of (B) and (C) are present such that the molar ratio of silicon-bonded hydrogen atoms to silicon-bonded hydroxyl radicals is from 1 to 5.

The spongeable silicone compositions of this invention are best prepared by thoroughly mixing a polydiorganosiloxane gum base stock with a mixture of (B), (C), (D) and (E). The mixing can be done by conventional mixers such as dough type mixers or on a rubber mill. The only precaution should be that the mixture should not see a temperature above the activation temperature which is about 125° C., preferably the temperature is maintained below 100° C. Alternatively, the organosiloxane, (B), can be combined with the polydiorganosiloxane gum base stock and thereafter a mixture of (C), (D) and (E) is mixed with the combination of (A) and (B).

The spongeable silicone compositions which are prepared can be sponged and cured by heating the composition above 125° C. The composition can be packaged and stored in one container or can be packaged in two or more containers. Packaging where (B), (C) and (E) are not in the same contained provides the longest storage life. When heated above 125° C., the composition foams and cures to a sponge product. The sponge products are useful as pads, cushions, pillows, insulation and the like and find particular use where fire retardant properties are useful. The fire retardant properties can be improved by adding small amounts of carbon black such as less than 2 weight percent. The sponges are useful for use in buses, trains and airplanes.

The following example is presented for illustrative purposes only and should not be construed as limiting the present invention which is properly delineated in the claims.

EXAMPLE

A commercially available gum base stock comprising a reinforcing silica filled polydimethylsiloxane gum was mixed on a cooled rubber mill which reached a temperature between 50° and 60° C. with mixtures as defined in the Table. The amounts of ingredients shown in the Table were parts by weight and were added as a mixture to 100 parts of the gum base stock.

Ingredient A was a hydroxyl endblocked polydimethylsiloxane having about 4 weight percent silicon-bonded hydroxyl radical.

Ingredient B was a trimethylsiloxy endblocked polymethylhydrogensiloxane having about 1.6 weight percent silicon-bonded hydrogen atom.

Ingredient C was a copolymer of two trimethylsiloxy units and one methylhydrogensiloxane unit.

Ingredient D was a chloroplatinic acid catalyst complx with symetrical divinyltetramethyldisiloxane containing about 0.65 weight percent platinum. The platinum catalyst is defined in the Table in parts of platinum per one million parts of composition (p.p.m.).

Ingredient E was 3-methyl-1-pentyl-3-ol.
Ingredient F was 3-methyl-1-butyn-3-ol.
Ingredient G was 1-ethynylcyclohexan-1-ol.
Ingredient H was a mixture of 6 parts by weight chloroplatinic acid hexahydrate in 94 parts by weight isopropanol.
Ingredient I was sodium bicarbonate.
Ingredient J was a reinforcing fume silica.

All the compositions defined by the Table formed elastomeric sponge products after hearing at 150° C. The sponges were formed from compositions 1, 2, 3, 6, 7, 8 and 9 were closed cell foams whereas 4 and 5 were open cell foams. The sponges had densities from 0.24 to 0.43 grams per cubic centimeter.

Table

| Composition | A | B | C | Ingredient D (p.p.m.) | E | F | G | H | I | J |
|---|---|---|---|---|---|---|---|---|---|---|
| 1 | 25 | 10.9 | — | 11 | 0.08 | — | — | — | — | — |
| 2 | 25 | 10.9 | — | 11 | — | 0.4 | — | — | — | — |
| 3 | 20 | 8.7 | — | 12 | 0.08 | — | — | — | — | — |
| 4 | 25 | 6.6 | 15.7 | 11 | 0.08 | — | — | — | — | — |
| 5 | 25 | 6.6 | 15.7 | 11 | — | 0.4 | — | — | — | — |
| 6 | 50 | 10.9 | — | 11 | 0.08 | — | — | 12 | — |
| 7 | 20 | 11 | — | — | — | — | 0.1 | 0.1 | — | 10 |
| 8* | 25 | 15 | — | — | — | — | 0.1 | 0.1 | — | 10 |
| 9 | 25 | 5 | — | — | — | — | 0.1 | 0.1 | — | 10 |

*Contains 0.5 part by weight iron oxide.

That which is claimed is:
1. A spongeable silicone composition comprising:

A. 100 parts by weight of a polydiorganosiloxane gum base stock wherein the gum has a Williams plasticity of greater than 0.030 inch,
B. from 15 to 60 parts by weight of an organosiloxane having an average of at least 2 silicon-bonded hydroxyl radicals per molecule, where the organosiloxane (B) has from 0.5 to 3 parts by weight silicon-bonded hydroxyl radical in the amount of organosiloxane (B) present,
C. from 3 to 25 parts by weight of an organohydrogensiloxane having an average of at least 2.5 siliconbonded hydrogen atoms per molecule, where the organohydrogenisiloxane (C) has from 0.01 to 0.5 parts by weight silicon-bonded hydrogen atoms in the amount of organohydrogensiloxane (C) present,
D. from 0.05 to 0.5 parts by weight of an acetylenic alcohol inhibitor, and
E. from 1 to 200 parts by weight platinum per one million parts by weight silicon composition wherein the platinum is in the form of a platinum catalyst, in said spongeable silicone composition (B) and (C) are present in amounts such that the molar ratio of silicon-bonded hydrogen atoms to silicon-bonded hydroxyl radicals is from 1 to 5.

2. The spongeable silicone composition according to claim 1 in which the organosiloxane of (B) is a hydroxyl endblocked polydimethylsiloxane having a viscosity of from 20 to 200 cps. at 25° C.

3. The spongeable silicone composition according to claim 1 in which the organohydrogenisiloxane of (C) is a trimethylsiloxy endblocked polymethylhydrogensiloxane having a viscosity of from 10 to 200 cps. at 25° C.

4. The spongeable silicone composition according to claim 2 in which the organohydrogensiloxane of (C) is a trimethylsiloxy endblocked polymethylhydrogensiloxane having a viscosity of from 10 to 200 cps. at 25° C.

5. The spongeable silicone composition according to claim 1 in which the inhibitor of (D) is 3-methyl-1-pentyl-3-ol.

6. The spongeable silicone composition according to claim 2 in which the inhibitor of (D) is 3-methyl-1-pentyn-3-ol.

7. The spongeable silicone composition according to claim 3 in which the inhibitor of (D) is 3-methyl-1-pentyl-3-ol.

8. The spongeable silicone composition according to claim 4 in which the inhibitor of (D) is 3-methyl-1-pentyl-3-ol.

9. The spongeable silicone composition according to claim 5 in which the inhibitor of (D) is 3-methyl-1-pentyn-3-ol.

10. The spongeable silicone composition according to claim 1 in which the inhibitor of (D) is 3-methyl-1-butyn-3-ol.

11. The spongeable silicone composition according to claim 1 in which the inhibitor of (D) is 1-ethynylcyclohexan-1-ol.

12. A method of making a spongeable silicone composition comprising mixing
A. 100 parts by weight of a polydiorganosiloxane gum base stock wherein the gum has a Williams plasticity of greater than 0.030 inch and a mixture comprising
B. from 15 to 60 parts by weight of an organosiloxane having an average of at least 2 silicon-bonded hydroxyl radicals per molecule, where the organosiloxane (B) has from 0.5 to 3 part by weight silicon-bonded hydroxyl radicals in the amount of organosiloxane (B) present,
C. from 3 to 25 parts by weight of an organohydrogensiloxane having an average of at least 2.5 siliconbonded hydrogen atoms per molecule, where the organohydrogensiloxane (C) has from 0.01 to 0.5 parts by weight silicon-bonded hydrogen atoms in the amount of organohydrogensiloxane (C) present,
D. from 0.05 to 0.5 parts by weight of an acetylenic alcohol inhibitor and
E. from 1 to 200 parts by weight platinum per one million parts by weight of the silicone composition wherein the platinum is in the form of a platinum catalyst, in said spongeable silicone composition (B) and (C) are present in amounts such that the molar ratio of silicon-bonded hydrogen atoms to silicon-bonded hydroxyl radicals is from 1 to 5.

13. The method in accordance with claim 12 in which the organosiloxane having silicon-bonded hydroxyl radicals is a hydroxyl endblocked polydimethylsiloxane having a viscosity of from 20 to 200 cps. at 25° C., the organohydrogensiloxane having silicon-bonded hydrogen atoms is a trimethylsiloxy endblocked polymethylhydrogensiloxane having a viscosity of from 10 to 200 cps. at 25° C. and the acetylenic alcohol inhibitor is selected from the group consisting of 3-methyl-1-pentyl-3-ol, 3-methyl-1-butyn-3-ol and 1-ethynylcyclohexan-1-ol.

14. The method in accordance with claim 12 in which the organosiloxane having silicon-bonded hydroxyl radicals is included in the polydiorganosiloxane gum base stock.

15. A method of sponging a silicone composition comprising heating the composition of claim 1 above 125° C.

16. A silicone sponge prepared by the method of claim 15.

* * * * *

UNITED STATES PATENT AND TRADEMARK OFFICE
CERTIFICATE OF CORRECTION

PATENT NO. : 4,024,091

DATED : May 17, 1977

INVENTOR(S) : Chi-Long Lee and Gary M. Ronk

It is certified that error appears in the above-identified patent and that said Letters Patent are hereby corrected as shown below.

In Column 1, line 20; the word "catalyts" should read "catalysts".

In Column 1, line 29; the word "partuclate" should read "particulate".

In Column 1, line 59; the word "beznene" should read "benzene".

In Column 4, line 27; the formula "RSHiO" should read "RHSiO".

In Column 6, line 4; the word "contained" should read "container".

In Column 6, line 35; the word "complx" should read "complex".

In Column 6, line 48; the word "hearing" should read "heating".

In Column 7, line 13; the word "organohydrogenisiloxane" should read "organohydrogensiloxane".

In Column 7, line 31; the word "organohydrogenisiloxane" should read "organohydrogensiloxane".

In Column 8, line 16; the word "part" should read "parts".

UNITED STATES PATENT AND TRADEMARK OFFICE
CERTIFICATE OF CORRECTION

PATENT NO. : 4,024,091

DATED : May 17, 1977

INVENTOR(S) : Chi-Long Lee and Gary M. Ronk

It is certified that error appears in the above-identified patent and that said Letters Patent are hereby corrected as shown below:

In Column 8, line 21; the word "siliconbonded" should read "silicon-bonded".

In Column 8, line 45; the word "pentyl" should read "pentyn".

Signed and Sealed this

Fifteenth Day of December 1981

[SEAL]

Attest:

GERALD J. MOSSINGHOFF

Attesting Officer

Commissioner of Patents and Trademarks